Figure 1:
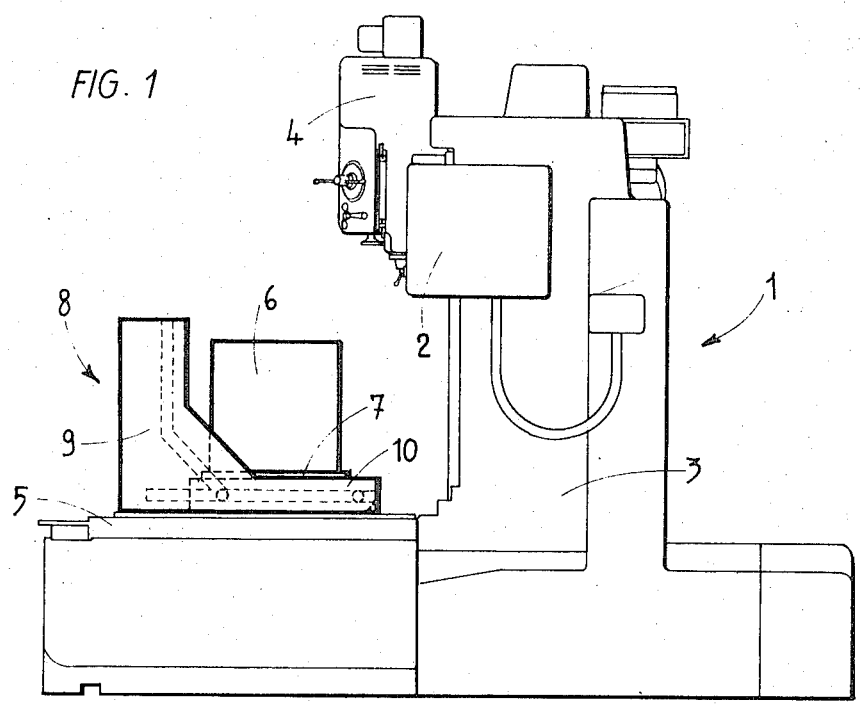

United States Patent [19]
Tabard

[11] 3,822,959
[45] July 9, 1974

[54] DIVIDING OR INDEXING APPARATUS

[75] Inventor: Jean-Louis Tabard, Geneva, Switzerland

[73] Assignee: Societe Genevoise D'Instruments de Physique, Geneva, Switzerland

[22] Filed: July 25, 1972

[21] Appl. No.: 274,911

[30] Foreign Application Priority Data
Aug. 4, 1971  Switzerland................. 11508/71

[52] U.S. Cl............. 408/89, 408/234, 90/DIG. 20, 90/DIG. 21, 51/216 ND
[51] Int. Cl.......................................... B23b 41/00
[58] Field of Search............ 408/91, 89, 87, 71, 72, 408/67, 234, 241 R; 90/DIG. 21, DIG. 20, 58 R, 58 B, 58 C, 56; 269/55

[56] References Cited
UNITED STATES PATENTS

| | | | |
|---|---|---|---|
| 2,365,436 | 12/1944 | Saucier | 90/DIG. 21 |
| 2,819,654 | 1/1958 | Coy | 90/DIG. 21 |
| D162,433 | 3/1951 | Nomann et al. | 90/DIG. 20 |

FOREIGN PATENTS OR APPLICATIONS

| | | | |
|---|---|---|---|
| 171,525 | 11/1921 | Great Britain | 90/DIG. 20 |

Primary Examiner—Gil Weidenfeld
Attorney, Agent, or Firm—Ross, Ross & Flavin

[57] ABSTRACT

Dividing or indexing apparatus for a machine tool, the apparatus including an inclinable rotatable plate and a frame comprising two portions, namely, a stationary portion, secured to the machine, and a portion movable with respect to the stationary portion, the movable portion carrying the rotatable plate, the frame being so arranged that its movable portion can effect a double movement, on the one hand of translation and on the other hand of rotation around a geometrical axis which is itself movable, permitting rocking movement of the plate.

1 Claim, 4 Drawing Figures

PATENTED JUL 9 1974 3,822,959

DIVIDING OR INDEXING APPARATUS

The present invention relates to a dividing or indexing apparatus for a machine tool, the apparatus having an inclinable rotatable plate, and a frame which comprises two portions, i.e., a stationary portion, secured to the said machine, and a portion movable with respect to the stationary portion and carrying the rotatable plate.

This apparatus is characterized by the fact that the frame is arranged in such a way that its movable portion can effect a double movement, on the one hand one of translation and on the other hand one of rotation around a geometrical axis which is itself movable, thus permitting rocking movement of the plate.

The drawing shows, by way of example, one embodiment of the invention.

Figure 2:
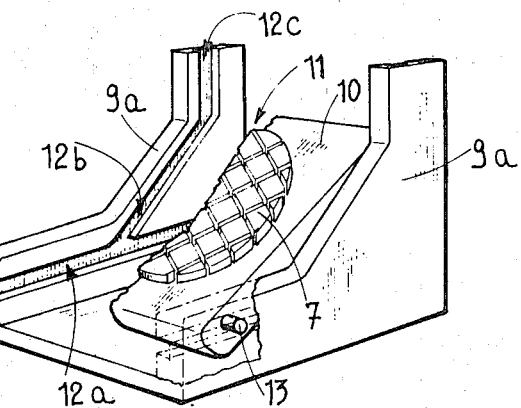
Figure 3:
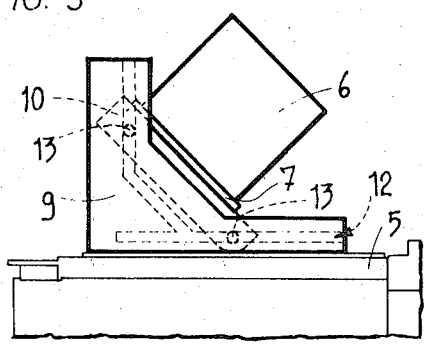
Figure 4:
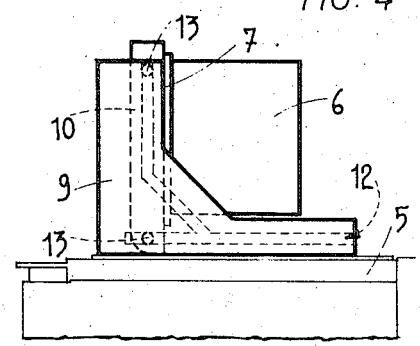

FIG. 1 is an elevational lateral view of a dividing or indexing apparatus mounted on a boring machine, FIG. 2 is a diagrammatic perspective view, with portions broken away, of the apparatus of FIG. 1, at an enlarged scale, and FIGS. 3 and 4 are lateral elevational views of the dividing or indexing apparatus and of a portion of the boring machine, in two different positions of the dividing or indexing apparatus.

The boring machine represented in FIG. 1, generally designated by 1, comprises an horizontal transverse member 2 supported by an awning comprising two vertical columns 3 along which the transverse member 2 can move vertically. The transverse member 2 carries a head-stock 4 which is horizontally movable. The table of the machine, designated by 5, is arranged in such a way as to be able to move horizontally between the columns 3 of the awning, so as to move the workpiece, represented in the example merely by a cube 6, with reference to the headstock 4.

The workpiece is secured to the plate 7 of a dividing or indexing apparatus, generally designated by 8, which comprises a frame made of two portions, one of which 9 is stationary and is secured to the table 5, and the other of which 10 is movable and is constituted by a square plate with said plate 7 rotatably mounted thereon.

The stationary portion 9 of the frame of the dividing apparatus comprises two lateral flanges 9a which are parallel to each other, and between which is provided a free space 11 in which is located the movable portion 10 of the frame. Each flange 9a is provided with a groove 12 comprising an horizontal portion 12a which merges with an inclined portion 12b which itself merges with a vertical portion 12c. The two grooves 12 of the two flanges 9a are parallel. It is to be noted that the horizontal portion 12a extends beyond the intersection of this portion with the inclined portion 12b. The movable portion 10 of the frame carries, in the vicinity of its four corners, two pairs of lateral pins 13 engaged, by pair, in the two grooves 12 of the lateral flanges 9a. Each pin of one of the two pairs is coaxial with the corresponding pin of the other pair.

Owing to this arrangement, the movable portion 10 of the frame can pass from a position in which it is horizontal (FIG. 1) to a position in which it is vertical (FIG. 4), by a sliding of the pins 13 in the grooves 12, thus effecting a movement of rotation extending up to 90°, combined with a movement of translation during which it passes in all the intermediary positions, among which is the position of inclination of 45° as represented in FIG. 3.

Owing to the fact that the geometrical axis of rotation of the movable portion is moved during the movement of the movable portion, the volume of the space occupied by the said movable portion during its displacements is much lower than it were if this axis would be stationary, located for instance at the front portion of the movable portion 10 or in the middle thereof.

What I claim is:

1. In a dividing or indexing apparatus for a machine, the combination of:
   a frame including a stationary portion secured to the machine and a movable portion movable relative to the stationary portion,
   a plate rotatably mounted on the movable portion,
   means for effecting movement of the movable portion relative to the stationary portion through a first movement of translation and a second movement of rotation around a movable geometrical axis and including two parallel ramps on the stationary portion, each ramp consisting of an horizontal portion merging with an inclined portion, with a free space between the ramps being partially occupied by the movable portion of the frame, and means on the movable portion bearing on the ramps for ensuring guiding of the movable portion during its displacements.

* * * * *